Feb. 16, 1932. T. M. LOVERIDGE 1,845,611

TOW BAR

Filed Jan. 25, 1929 2 Sheets-Sheet 1

Feb. 16, 1932.  T. M. LOVERIDGE  1,845,611
TOW BAR
Filed Jan. 25, 1929  2 Sheets-Sheet 2
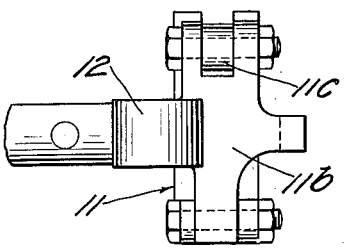
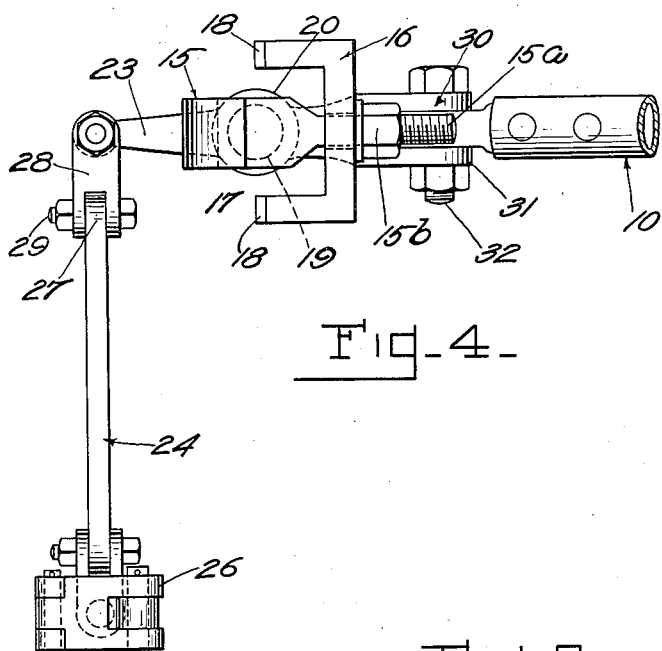
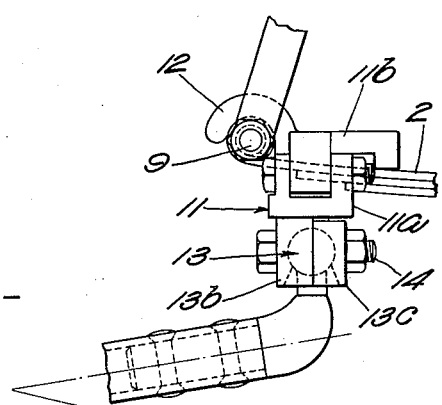
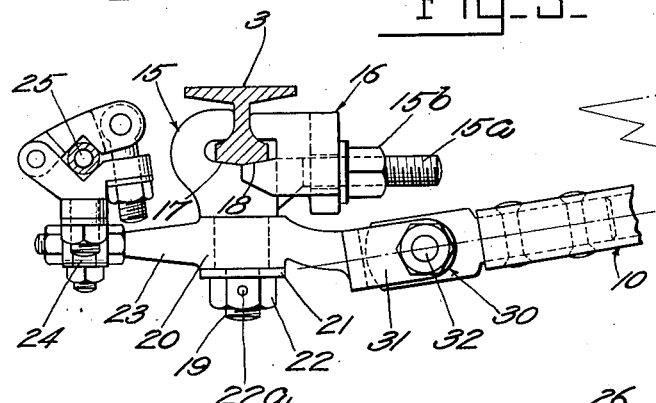
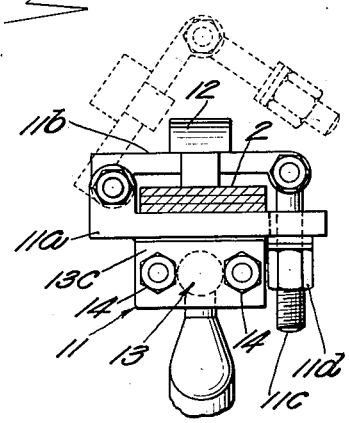
INVENTOR=
Thomas M. Loveridge,
by MacLeod, Calver, Copeland & Dike.
Attys.

Patented Feb. 16, 1932

1,845,611

UNITED STATES PATENT OFFICE

THOMAS M. LOVERIDGE, OF GROSSE POINTE PARK, MICHIGAN

TOW BAR

Application filed January 25, 1929. Serial No. 335,036.

This invention relates to a device for joining one vehicle to another to be drawn thereby and more particularly to a tow bar for accomplishing this result.

It is common practice in the automobile trade for dealers, especially dealers located in the neighborhood of the factory from which they obtain their cars, to come to the factory and drive back their cars instead of waiting for delivery by freight. To save time and the expense of an extra driver two cars are ordinarily connected together and the second towed by the first. A great deal of difficulty has been experienced in finding a suitable means for connecting two cars together so that only one need be operated under power and so that the towed car can be steered and adequately controlled from the towing car without requiring a driver for the car being towed. If a flexible connection is used such as a rope or chain there is no control over the car being towed which is liable to smash into the rear end of the towing car, damaging either or both cars, and constituting a source of danger to other drivers on the road due to the whipping about of the car in tow. If the connecting means used is too rigid, it is subjected to very severe strain due to the relative vertical movement between the two vehicles in absorbing the ordinary shocks of the road and due to the relative lateral movement of the cars incident to making turns, thus rendering the tow bar liable to break and jeopardizing not only the driver of the towing car and the cars themselves but exposing other drivers as well to the danger of a loose car, moving without control.

By my invention, I have provided an improved form of tow bar which, while rigid, permits a high degree of relative movement between the connecting vehicles, thus overcoming the difficulties which heretofore have been encountered, and which permits the car being towed to be drawn, steered and otherwise controlled by the towing car without requiring the service of a second driver.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Fig. 3 is a side elevation on an enlarged scale of the tow bar, and parts to which it is connected, showing the details of construction;

Fig. 4 is a plan view of the tow car on an enlarged scale, showing the drag link connection to the rear end of the tow bar;

Fig. 5 is an end view looking from the left in Figs. 3 and 4, and

Fig. 6 is an end view looking from the right in Figs. 3 and 4.

Figure 2:
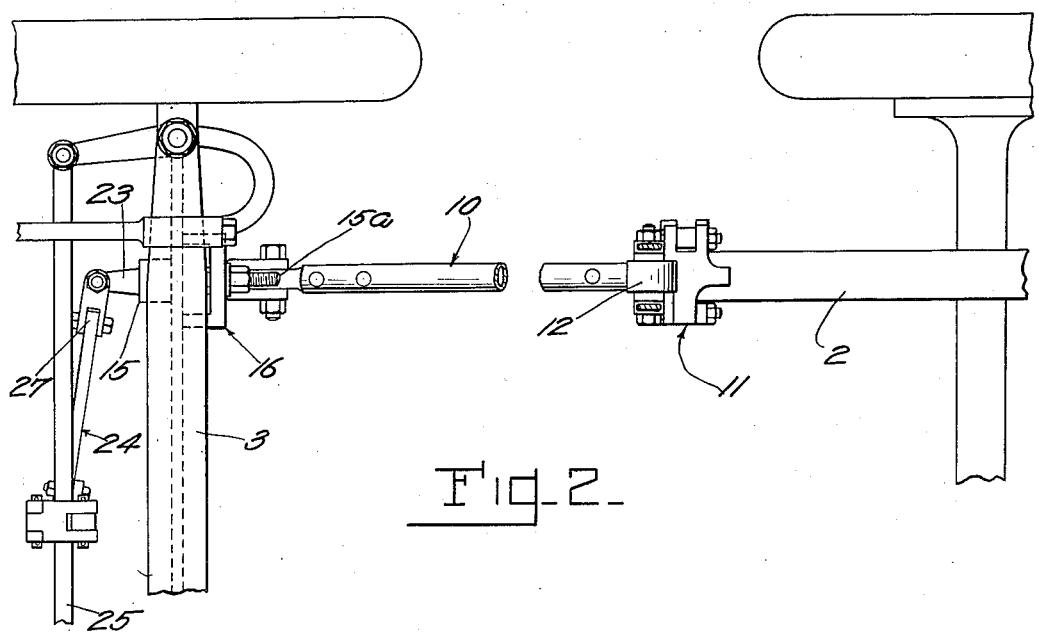
Fig. 2 is a plan view of the embodiment shown in Fig. 1.
Figure 1:
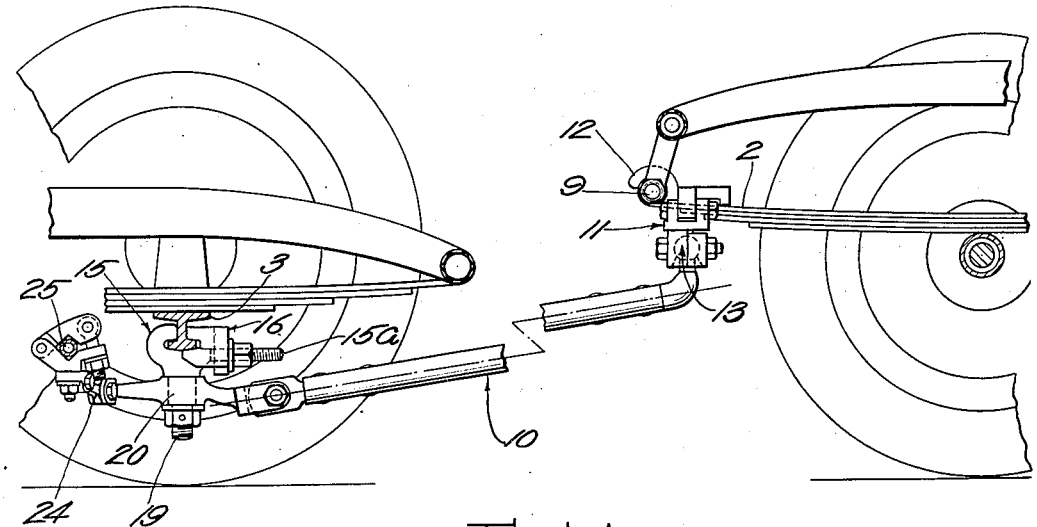
Fig. 1 is a side elevation of an embodiment of my invention, showing the tow bar connected respectively to the rear spring of the towing car and to the front axle of the car in tow.

Referring now to the drawings, in Figs. 1 and 2, the rear end of a towing car and the front end of a car in tow are shown joined together by a rigid tow bar denoted generally as 10. The bar is connected to the rear spring 2 of the towing car and to the front axle 3 of the car in tow. The tow bar is provided at its front end with a hinged clamp 11 which comprises the bottom member 11a, the hinged member 11b, and the locking arm 11c pivotally supported at one end of the arm 11b. The free end of the bottom clamp member 11a is bifurcated to receive the locking arm 11c. In order to connect the tow bar 10 to the towing car, the clamp 11 is slipped around the rear spring from the side and closed. The clamp is held in closed position by means of the nut 11d which may be threaded on the locking arm 11c, and when tightened abuts against the bifurcated end of the member 11a thereby preventing the withdrawal of the locking arm 11c.

The top member 11b of the clamp is also provided with a hook member 12, extending longitudinally of the spring, which fits over the rear end of the spring at the shackle bolt 9 and serves as a safety device preventing the tow bar from falling clear of the spring in case the clamp locking arm 11c should come loose.

Below the front clamp 11 the ball and socket joint 13 is provided permitting relative movement between the spring 2 and the bar both in a vertical plane and laterally in horizontal plane, thus eliminating strain on the main bar due to spring reaction. The socket 13 may be formed in two parts, 13b and 13c, one part 13b being formed integrally with the bottom member 11b of the clamp 11 and the other part 11c being bolted thereto by means of the bolts 14.

The tow bar is secured to the front axle 3 of the car in tow by a clamp consisting of the two parts 15 and 16. The clamp member 15 supports a long screw 15a extending forwardly in a direction perpendicular to the axle of the car being towed. The clamp member 16 is mounted on the arm 15a, and may be tightened or loosened by adjusting the nut 15b. The screw arm 15a is sufficiently long so that the clamping members 15 and 16 may be loosened and the clamp removed from the axle 3 without removing the nut 15b from the bolt 15a. The gripping surfaces 17 and 18 of each of the clamping members 15 and 16 are inclined to complement the bevelled surface of the bottom of the axle 3. By means of the clamp members which provide positive contact with the front axle in all directions, all possibility of slippage may be eliminated by sufficiently tightening the nut 15b.

The rear clamp members 15 and 16 are connected to the tow bar by means of the rod 19, formed integrally with the member 15 and extending downwardly therefrom, journalled in the collar 20 of the tow bar. The washer 21 and nut 22 retaining the rod 19 in place within the collar 20 are held in place by means of a cotter pin 22a thus preventing the nut from either tightening or becoming too loose. The connection permits free movement of the tow bar in a horizontal direction thereby facilitating the steering of the car-in-tow.

Just forward of the rear clamp, the tow bar is provided with a joint 30 permitting vertical movement of the axle of the car in tow, due to spring action, without subjecting the tow bar to any additional strain. The joint 30 may be formed by means of the clevis 31 and clevis pin 32 joining the rear portion to the body of the bar. Extending rearwardly from the collar 20 of the tow bar is an arm 23, and pivotally secured to the end of the arm 23, as indicated at 40, a drag link 24 is provided. The free end of the drag link 24 is clamped to the tie rod 25 of the vehicle to be towed by means of the clamp 26 whereby positive steering action and control over the car-in-tow is obtained. The clamp 26 is pivotally connected to the drag link 24 as indicated at 50, see particularly Fig. 5. The clamp 26 is also a hinged clamp similar to the clamp 11 described above, permitting easy attachment to the tie rod 25 and eliminating all possibility of its parts being lost during shipment or while not in use.

The drag link 24 is provided intermediate its ends with joints 27, the members 28 of each joint by which the drag link 24 is pivotally joined to the tow bar and clamp 26 having a bifurcated end to which the drag link is secured by the bolt 29. The joints 27 in the drag link 24 and the pivotal connections of said drag link with the tow bar and clamp 26 indicated at 40 and 50 respectively constitute in effect a universal joint thus permitting the drag link to be connected by means of its clamp 26 to the tie rod of any vehicle, the position of said tie rod differing slightly in different makes and types.

It will be noted that in effect there are three universal joint connections in my tow bar, the first comprising the ball and socket joint 13 connecting the front end of the tow bar to the clamping means engaging the rear spring of the towing car, the second comprising the joint 30 permitting vertical movement and the pintle or rod 19 about which the collar 20 is pivoted for lateral pivotal movement, connecting the rear end of the tow bar to the front axle of the towed vehicle, and the third universal connection comprising the hinged connections 40 and 50 at the ends of the drag links 24 permitting lateral pivotal movement of the drag link, and the joints 27 intermediate the ends of the drag link 24 permitting vertical movement in said links. Thus I have provided a tow bar of great flexibility but of the necessary rigidity, and most suitable for towing most makes of cars. The clamping arrangement likewise facilitates easy attachment and removal of the towing bar.

I claim:

1. A device for joining one vehicle to another to be drawn thereby comprising a bar having at its front end a clamp for attachment to the rear spring of a vehicle and an additional safety attachment comprising a hook adapted to engage the shackle bolt of said spring.

2. A device for joining one vehicle to another to be drawn thereby comprising a bar having at its front end a hinged clamp engageable with a vehicle spring, auxiliary means carried by said clamp for engaging the shackle bolt of said spring, and a connection between said bar and said attachment means permitting relative vertical and lateral movement of the rear portion of the bar with respect to said attaching means.

3. A device for joining one vehicle to another, comprising a bar having at one end attaching means comprising a hook and clamp combination, said hook serving to position said clamp on a vehicle spring and to engage the shackle bolt of said spring, and said clamp having locking means for engaging said spring.

4. A device for joining one vehicle to another to be drawn thereby comprising in combination a bar having means at one end for attachment to a towed vehicle and having at the other end a hinged clamp for attachment to the rear spring of the towing vehicle and a hook engageable with the shackle bolt of said spring for preventing longitudinal movement of said clamp on said spring.

5. A device for joining one vehicle to another to be drawn thereby comprising a combination of a bar having at one end a hinged clamp for attachment to the rear spring of the towing vehicle, an auxiliary attachment means comprising a hook adapted to fit over the shackle bolt of said spring, a ball and socket joint intermediate said hinged clamp and said bar, and at the other end of said bar a two part adjustable clamp for attachment to the front axle of the towed vehicle, said clamp members having inclined surfaces to frictionally engage the inclined under surface of the axle of a vehicle being towed, one of said clamp members having a forwardly extending screw threaded arm on which said other clamp is adjustably mounted, said first mentioned clamp member having a downward extension comprising a pintle journalled in a collar which in turn is hinged to said bar on one side, and on the other side is hinged to a link connected to the steering mechanism of the towed vehicle.

6. A device for joining one vehicle to another to be drawn thereby, comprising in combination, a bar, hinged clamping means for attaching one end of said bar to the rear spring of the towing vehicle, a hook adapted to engage the shackle bolt of said spring, a ball and socket joint intermediate said clamping means and said bar, clamping means for engaging the front axle of the towed vehicle, a drag link attached to the steering rod of the towed vehicle, a pintle extending vertically from said second clamping means, a lever journalled on said pintle and connecting said drag link to the other end of said bar.

7. A device for joining one vehicle to another to be drawn thereby, comprising in combination, a bar, hinged clamping means for attaching one end of said bar to the rear spring of the towing vehicle, a ball and socket joint intermediate said clamping means and said bar, clamping means for engaging the front axle of the towed vehicle, a drag link attached to the steering rod of the towed vehicle, a pintle extending vertically from said second clamping means, a lever journalled on said pintle and connecting said drag link to the other end of said bar, said drag link having hinge connections intermediate its ends to permit said link to fit vehicles having varying distances and positions between their respective front axles and steering rods.

8. A device for joining the vehicle to another to be drawn thereby, comprising in combination, a bar, hinged clamping means for attaching one end of said bar to the rear spring of the towing vehicle, a hook adapted to engage the shackle bolt of said spring, a ball and socket joint intermediate said clamping means and said bar, clamping means for attaching the other end of the said bar to the front axle of the towed vehicle, a pintle extending vertically from said second clamping means, a lever pivoted for lateral movement about said pintle, a hinge connecting the front end of said lever and the rear end of said bar for relative vertical movement therebetween, a drag link joining the rear end of said lever and the steering rod of the towing vehicle, hinged clamping means for attaching said drag link to said steering rod, hinged connections at the ends of said drag link to permit lateral movement of said link, and hinged connections intermediate its ends to permit vertical movement in said link.

9. A device for joining one vehicle to another to be drawn thereby, comprising a bar, clamping means for attaching one end of said bar to the towing vehicle, a universal joint connection intermediate said clamping means and said bar, clamping means for attaching the other end of said bar to the towing vehicle, a universal joint connection intermediate said second clamping means and said bar, an extension of said bar including said universal joint connection, a drag link connecting the extension of said bar and the steering rod of the towed vehicle, clamping means for attaching said drag link to said steering rod, and a universal joint connection intermediate said third clamping means and said extension of said bar.

In testimony whereof I affix my signature.

THOMAS M. LOVERIDGE.